United States Patent [19]

Beugelsdyk

[11] 4,455,811
[45] Jun. 26, 1984

[54] BAIL ATTACHMENT LAWNMOWER ZONE START CONTROL

[75] Inventor: Anthony F. Beugelsdyk, Wichita, Kans.

[73] Assignee: Conchemco, Incorporated, Lenexa, Kans.

[21] Appl. No.: 459,409

[22] Filed: Jan. 20, 1983

[51] Int. Cl.³ .............................................. A01D 75/20
[52] U.S. Cl. ...................................... 56/10.8; 56/11.3;
   56/11.8; 180/19.3; 192/0.094
[58] Field of Search ...................... 56/11.3, 11.7, 11.8,
   56/10.8, 10.5; 180/19.3, 272; 192/0.094

[56] References Cited

U.S. PATENT DOCUMENTS

| 4,132,280 | 1/1979 | Jones et al. | 180/19.3 |
| 4,155,418 | 5/1979 | Tremblay et al. | 180/272 |
| 4,212,141 | 7/1980 | Miyazawa et al. | 56/11.3 |
| 4,281,732 | 8/1981 | Hoch | 56/11.8 |
| 4,335,566 | 6/1982 | Hurd | 56/11.3 |
| 4,362,228 | 12/1982 | Plamper et al. | 56/11.3 |

Primary Examiner—Robert P. Swiatek
Assistant Examiner—David I. Tarnoff
Attorney, Agent, or Firm—Schmidt, Johnson, Hovey & Williams

[57] ABSTRACT

A compact, unitary attachment for the control handle of a power lawnmower is provided that couples a hand-graspable bail to the clutch control cable of the lawnmower. The attachment body is preferably molded from a synthetic resin material and includes a bail-receiving channel coupling the attachment to the bail for pivotal motion therewith, a slot for engageably receiving the end fitting of the cable, and a control handle-engaging arm extending from the attachment. The attachment body readily accommodates a spring for biasing the bail to a released position.

5 Claims, 11 Drawing Figures

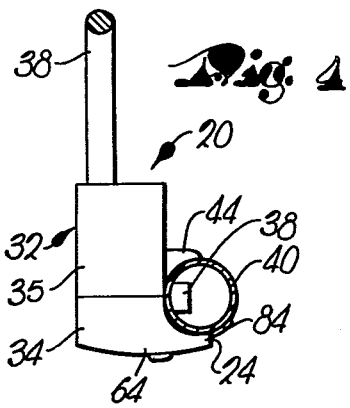
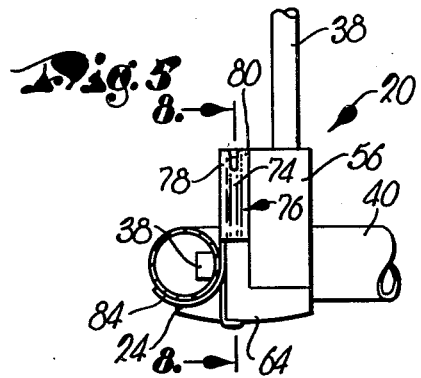
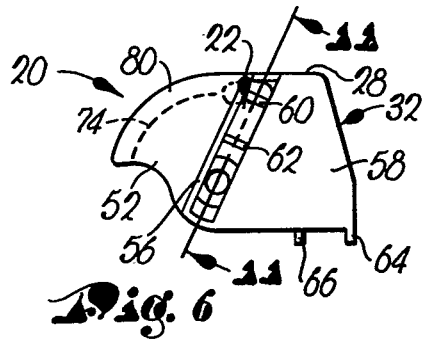
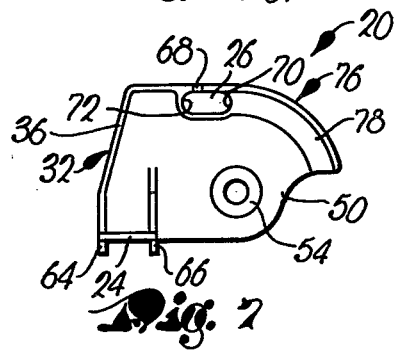
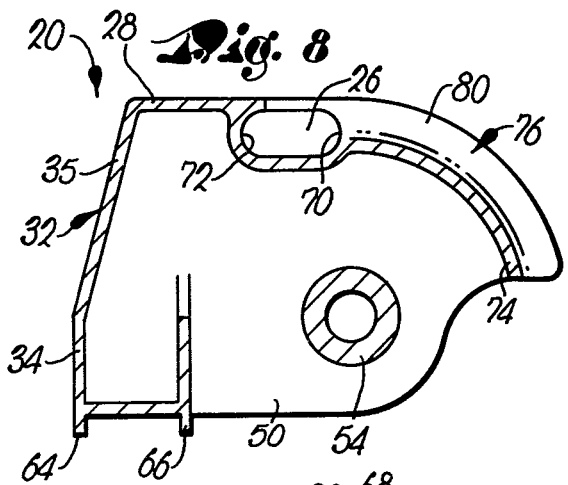
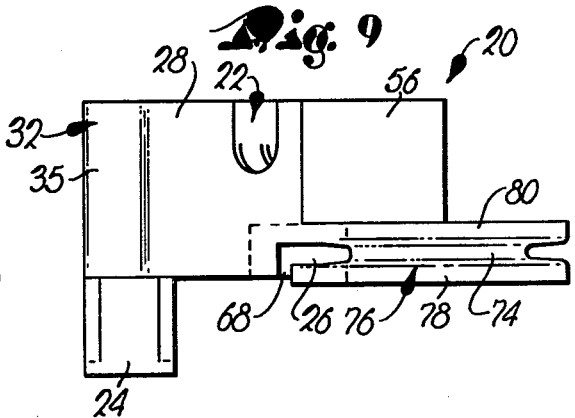
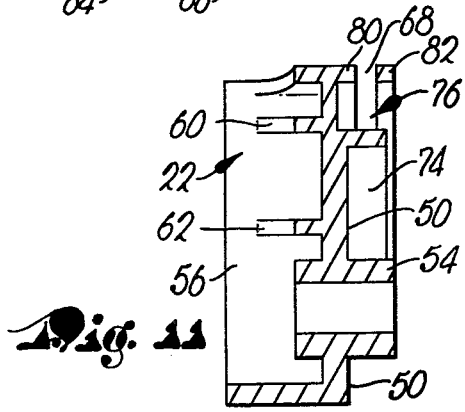
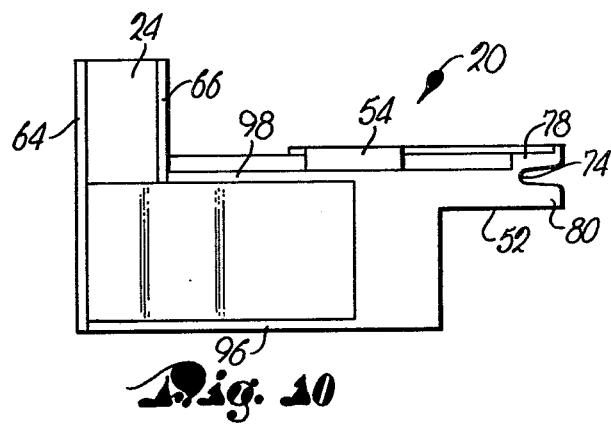

BAIL ATTACHMENT LAWNMOWER ZONE START CONTROL

BACKGROUND OF THE INVENTION

1. Field of the Invention

This invention relates to a unitary attachment for the control handle of a power lawnmower of simple yet highly effective construction that couples a hand graspable bail to a clutch control cable of the lawnmower for so-called "zone start" operation of the lawnmower. More particularly, it is concerned with a molded, synthetic resin attachment that includes a bail-receiving channel, a cable end fitting receiving slot, and a travel limiting arm.

2. Description of the Prior Art

So-called walk behind rotary mowers are well known and in widespread use. Generally speaking, such mowers include a lowermost housing supported on spaced wheels, with a gasoline powered engine coupled to a rotary mower blade disposed within the housing. An elongated control handle is affixed to the housing at the rear thereof so that the user simply pushes the mower in a "walk behind" fashion.

In recent years the government has promulgated a number of safety regulations relating to mowers of the type described. For example, such mowers must be equipped with a so-called "dead man" switch which generally includes a spring biased handle grasped by the operator during normal operation of the mower and which remotely engages the motor flywheel with a band brake and which disconnects the motor ignition circuitry when released. In addition, it has now been proposed that walk behind mowers be provided with a control apparatus that requires the operator to be in a zone spaced apart from the rotary blade of the lawnmower before ignition of the motor can be actuated. For instance, the pull cord for initiating rotation of the motor can be provided with a handle spaced apart from the motor. Operation of a zone restart control lawnmower would require that an operator be in a zone, spaced apart from the lawnmower blade, where he could both depress the lever disengaging the flywheel brake and actuating the electrical circuit, and be in a position to pull the motor pull cord.

In view of these regulations, a low cost, compact, and reliable attachment for the control handle of a lawnmower is required that can translate the pivotal motion of an operator actuated lever into the linear motion required to shift a control cable connecting the lever to the mower band brake and ignition circuitry.

SUMMARY OF THE INVENTION

The present invention relates to a control apparatus for a control handle of a walk behind lawnmower which provides a simple, one piece, low cost means for translating the pivotal motion of an operator actuated lever into the linear motion required to shift a control cable. Broadly speaking, the attachment is molded from a synthetic resin material and includes a lever receiving channel coupling the attachment to a lever pivotally mounted on a lawnmower control handle, a slot for engageably receiving the end fitting of a control cable, and a control handle-engaging arm extending from the attachment.

BRIEF DESCRIPTION OF THE DRAWINGS

FIG. 4 is a sectional view taken along the line 4—4 of FIG. 2;

FIG. 5 is a sectional view taken along the line 5—5 of FIG. 2;

FIG. 6 is a side elevational view of an attachment in accordance with the present invention;

FIG. 7 is a side elevational view of the attachment depicting the opposite side from FIG. 6;

FIG. 8 is a sectional view taken along line 8—8 of FIG. 5;

FIG. 9 is a plan view of the attachment;

FIG. 10 is a bottom view of the attachment; and

FIG. 11 is a sectional view taken along line 11—11 of FIG. 6.

DETAILED DESCRIPTION OF THE DRAWINGS

Figure 1:
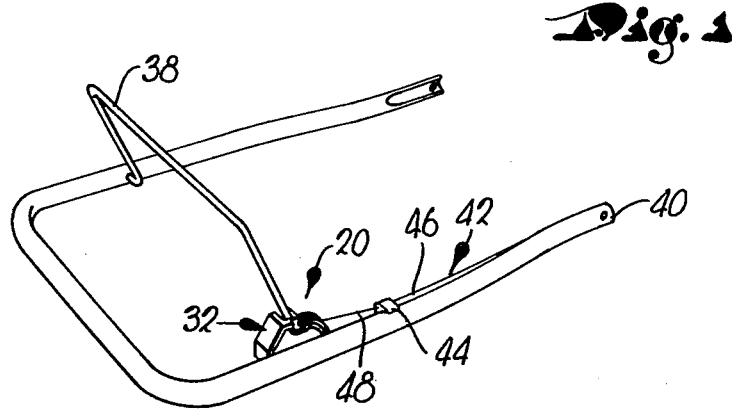
FIG. 1 is a perspective view of the control handle of a powered lawnmower having an attachment in accordance with the present invention mounted thereon.

Turning to the drawings, an attachment in accordance with the present invention broadly includes a unitary body 20 having a lever-retaining channel 22, an outwardly extending, handle-engaging arm 24, and a cable end portion-receiving slot 26. Body 20 has a top wall 28 and a rearwall 32 having a lower portion 34 generally perpendicular to top wall 28, and an upper portion 35 connecting the lower portion 34 to top wall 28. Lip 36 extends along one edge of rear wall 32 and top wall 28.

The attachment is depicted in FIGS. 1-5 attached to a shiftable lever or bail 38 that is pivotally mounted to the U-shaped control handle 40 of a power lawnmower. A cable 42 is attached to the handle 40 by fitting 44. The cable 42 includes a tubular outer sheath 46, a shiftable metallic element 48 received within the sheath 46, and an end portion 49.

The attachment body 20 has a generally planar configuration, and includes a pair of opposed faces 50, 52. A circular, apertured sleeve 54 defines the pivot point of body 20 through which the end portion of bail 38 is received.

Channel 22 is defined by a pair of outwardly extending projections 56, 58 extending from the face 52. Projection 56 is in the shape of an elongated ridge, and projection 58 comprises a built up surface on the face 52. A pair of reinforcing ribs 60, 62 are located in channel 22 transverse the axis of channel 22. The diameter of channel 22 is such that bail 38 is received therein in close fitting relationship.

Arm 24 projects outwardly from the face 50 at the lowermost edge thereof. As best seen in FIG. 4, arm 24 is contoured to complementary receive handle 40 therein. Arm 24 is supported by a pair of strength members 64, 66 projecting outwardly from face 50.

The upper edge of the body 20 includes a channel 68 communicating with slot 26. Slot 26 has an elongated shape having two, opposed, arcuate end walls 70, 72. An arcuate, cable-supporting surface 74 projects outwardly from face 50, and comprises the bottom wall of a cable guiding channel 76 having channel sidewalls 78, 80. Sidewall 78 includes peripheral lip 82.

Spring 84 is received around sleeve 54. One end of spring 84 is detained by the handle 40 and the opposed end is detained by one of the two downwardly extending edges 96, 98.

In operation, the attachment body 20 is easily snapped into place on bail 38 prior to pivotally mounting bail 38 to control handle 40. Metallic element 48 is inserted through channel 68 such that cable end portion 49 is retained within slot 26.

Figure 2:
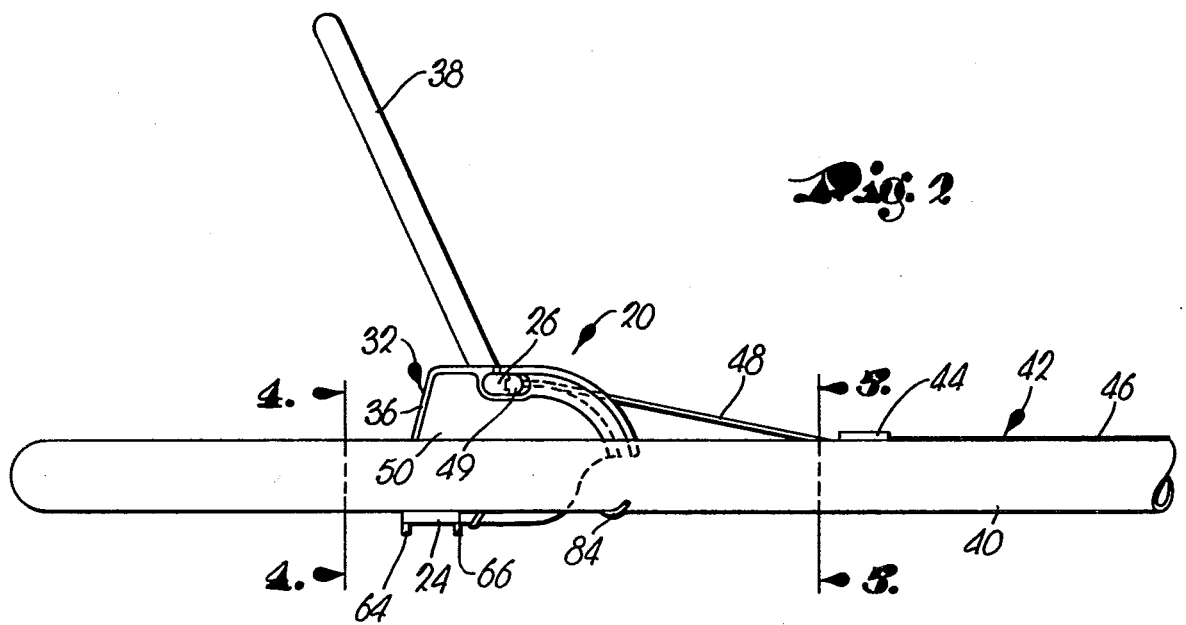
FIG. 2 is a fragementary side elevational view of the control handle of a lawnmower with an attachment in accordance with the present invention mounted thereon, and depicting a bail in the released position.
Figure 3:
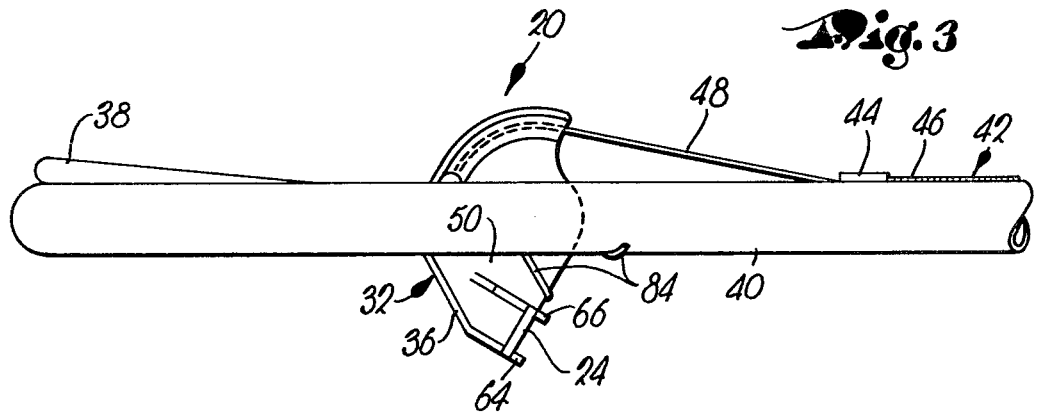
FIG. 3 is similar to FIG. 2 but depicting the bail in a grasped position.

Referring to FIG. 2, bail 38 is depicted in its released position, and the metallic element 48 of cable 42 is shown in its rest position. The cable is moved to the shifted position, as depicted in FIG. 3 by grasping the bail 38 and pivoting it downwardly until it abuts the control handle 40. The downward pivoting of bail 38 causes end wall 70 of slot 26 to abut against cable end portion 49, thereby pulling metallic element 48. Metallic element 48 is supported by arcuate surface 74 and the pivotal motion of bail 38 is thereby translated to linear cable element movement. Spring 84 returns the attachment and bail 39 to the released position when the operator lets go of the bail, and the metallic element 48 is moved from the shifted to the rest position.

Referring to FIG. 2, it will be noted that the cable end portion 49 is spaced apart from the forward end wall 70 of slot 26 when handle 14 is in the released position. The gap presented between the cable end portion 49 and the end wall 70 permits self-adjustment of the attachment to variations in the rest position of the cable 42. That is to say, the cable 42 may be connected to a band brake, as described above, which is in frictional alignment with the flywheel of the lawnmower motor such that the blade rotor rotation will be stopped by the brake when the cable 42 is shifted to the rest position. It will be appreciated that, as the band brake frictional surface wears, the position of cable 42 will shift. The gap presented between the cable end portion 49 and the end wall 70 of slot 26 provides enough free play in the attachment body 20 to adjust for the shifting orientation of the metallic element 48.

I claim:

1. An attachment for a lawnmower handle having a movable lever with a pair of opposed ends and a shiftable cable including a cable end portion comprising:
    a body having an aperture therethrough for receiving one of the ends of said movable lever;
    a channel formed in said body and in communication with said aperture for receiving a stretch of said movable lever adjacent said one end of the lever;
    means mounting said body on the lawnmower handle,
    said means including said one end of the movable lever outwardly beyond its extension through said aperture, said one end being pivotally received in an opening formed in said handle, the opening being in alignment with said aperture, whereby said body may be pivoted with respect to said handle when the lever is moved; and
    structure defining a slot within said body,
    said slot receiving said cable end portion, whereby said cable is shifted when said body is pivoted with respect to said handle by movement of said lever.

2. An attachment as set forth in claim 1, said body including an arm extending from said body beneath said handle in a position to engage said handle when the body is moved in a given direction by said lever to thereby limit movement of said lever.

3. An attachment as set forth in claim 2, said channel and said arm being on opposite sides of said body.

4. An attachment as set forth in claim 3, said body including an arcuate cable supporting surface positioned thereon between said channel and said arm.

5. An attachment as set forth in claim 1, said one end of the lever which extends through said aperture and into the opening in the handle being perpendicular to said stretch of the lever which is received within said channel.

* * * * *